United States Patent
Wang

(10) Patent No.: US 11,991,735 B2
(45) Date of Patent: May 21, 2024

(54) MEASUREMENT CONTROL METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 378 days.

(21) Appl. No.: 17/370,999

(22) Filed: Jul. 8, 2021

(65) Prior Publication Data

US 2021/0337554 A1 Oct. 28, 2021

Related U.S. Application Data

(63) Continuation of application No. PCT/CN2019/073538, filed on Jan. 28, 2019.

(51) Int. Cl.
  *H04W 72/542* (2023.01)
  *H04W 24/10* (2009.01)
  *H04W 72/0453* (2023.01)
  *H04W 72/23* (2023.01)

(52) U.S. Cl.
  CPC ......... *H04W 72/542* (2023.01); *H04W 24/10* (2013.01); *H04W 72/0453* (2013.01); *H04W 72/23* (2023.01)

(58) Field of Classification Search
  CPC ... H04W 24/10; H04W 72/23; H04W 72/542; H04L 5/001
  See application file for complete search history.

(56) References Cited

U.S. PATENT DOCUMENTS

| 2014/0321313 | A1 | 10/2014 | Seo et al. |
| 2016/0249243 | A1 | 8/2016 | Kim et al. |
| 2019/0045549 | A1* | 2/2019 | Wu .................. H04W 36/0055 |
| 2019/0124558 | A1* | 4/2019 | Ang ..................... H04W 36/06 |

(Continued)

FOREIGN PATENT DOCUMENTS

| CN | 102238754 A | 11/2011 |
| CN | 103220704 A | 7/2013 |

(Continued)

OTHER PUBLICATIONS

LG Electronics. "Discussion on Power Saving for CA Operation", 3GPP TSG RAN WG1 Meeting #95 R1-1812591, Nov. 16, 2018 (Nov. 16, 2018), section 2.

(Continued)

*Primary Examiner* — Yee F Lam
(74) *Attorney, Agent, or Firm* — Perkins Coie LLP

(57) ABSTRACT

Provided are a measurement control method, a terminal device and a network device, the method comprising that: the terminal device determines a first secondary cell entering a first state, the first state being a state in which the terminal is able to implement measurement but is not able to execute data reception and transmission, and the first secondary cell being one amongst at least one secondary cell; determines a target bandwidth part BWP of the first secondary cell in the first state; and performs measurement on the target BWP.

6 Claims, 8 Drawing Sheets

(56) References Cited

U.S. PATENT DOCUMENTS

| | | | | |
|---|---|---|---|---|
| 2019/0150172 A1* | 5/2019 | Ang | ............... | H04W 72/1268 |
| | | | | 370/329 |
| 2019/0230550 A1* | 7/2019 | Yiu | ............... | H04W 24/10 |
| 2019/0306739 A1* | 10/2019 | Kim | ............... | H04L 5/0096 |
| 2020/0029316 A1* | 1/2020 | Zhou | ............... | H04W 74/0833 |

FOREIGN PATENT DOCUMENTS

| | | |
|---|---|---|
| CN | 104025484 A | 9/2014 |
| CN | 108260139 A | 7/2018 |
| CN | 109150451 A | 1/2019 |
| CN | 109275191 A | 1/2019 |
| CN | 109963296 A | 7/2019 |

OTHER PUBLICATIONS

LG Electronics. "Discussion on Power Saving for CA Operation", 3GPP TSG RAN WG1 Meeting #94bis R1-1810312, Oct. 12, 2018 (Oct. 12, 2018), section 2.

LG Electronics. "Discussion on UE Adaptation to UE Power Consumption Characteristics", 3GPP TSG RAN WG1 Meeting #95 R1-1812587, Nov. 16, 2018 (Nov. 16, 2018), entire document.

International Search Report in the international application No. PCT/CN2019/073538, dated Oct. 28, 2019.

3GPP TS 38.321 V16.2.1 (Sep. 2020), 3rd Generation Partnership Project; Technical Specification Group Radio Access Network; NR; Medium Access Control (MAC) protocol specification (Release 16).

3GPP TS 38.331 V16.2.0 (Sep. 2020), 3rd Generation Partnership Project; Technical Specification Group Radio Access Network; NR; Radio Resource Control (RRC) protocol specification (Release 16).

First Office Action of the Chinese application No. 202110419507.0, dated Feb. 24, 2022. 19 pages with English Translation.

Notice of Allowance of the Chinese application No. 202110419507.0, dated Nov. 4, 2022. 6 pages with English translation.

Second Office Action of the Chinese application No. 202110419507.0, dated Jul. 14, 2022. 20 pages with English translation.

First Office Action of the European application No. 19913138.4, dated Jul. 13, 2022. 6 pages.

Second Office Action of the European application No. 19913138.4, dated Feb. 1, 2023. 6 pages.

MediaTek Inc. "Adaptation Designs for NR UE Power Saving" R1-1901298; 3GPP TSG RAN WG1 Ad-Hoc Meeting 1901; Taipei, Taiwan; Jan. 21-25, 2019. 14 pages.

Qualcomm Inc. "Dormant BWP for fast SCell activation" R2-1808570; 3GPP TSG-RAN WG2 Meeting #102; Busan, Korea; May 21-25, 2018. 2 pages.

Qualcomm Incorporated "Solutions for Fast SCG and SCell Activation" R1-1900922; 3GPP TSG-RAN WG1 Ad-Hoc Meeting 1901; Taipei, Taiwan, Jan. 21-25, 2019. 6 pages.

Qualcomm Incorporated "UE Adaptation to the Traffic and UE Power Consumption Characteristics" R1-1900911; 3GPP TSG-RAN WG1 Ad-Hoc Meeting 1901; Taipei, Taiwan; Jan. 21-25, 2019. 24 pages.

Supplementary European Search Report in European application No. 19913138.4, dated Nov. 24, 2021. 10 pages.

Written Opinion of the International Search Authority in the international application No. PCT/CN2019/073538, dated Oct. 28, 2019. 6 pages with English translation.

* cited by examiner

| $C_7$ | $C_6$ | $C_5$ | $C_4$ | $C_3$ | $C_2$ | $C_1$ | R | Oct 1 |
| $C_7$ | $C_6$ | $C_5$ | $C_4$ | $C_3$ | $C_2$ | $C_1$ | R | Oct 2 |

| C4 | C3 | C3 | C2 | C2 | C1 | $C_1$ | R | Oct 1 |
| $C_7$ | C7 | C6 | C6 | C5 | C5 | C4 | R | Oct 2 |

| $C_7$ | $C_6$ | $C_5$ | $C_4$ | $C_3$ | $C_2$ | $C_1$ | R | Oct 1 |
| R | Cz | Cz | Cy | Cy | Cx | Cx | R | Oct 2 |

The length is variable, and the length depends on the number of Scells indicated to enter the first state. In addition, 0 may be filled in the unoccupied position of the 8 bits in a byte

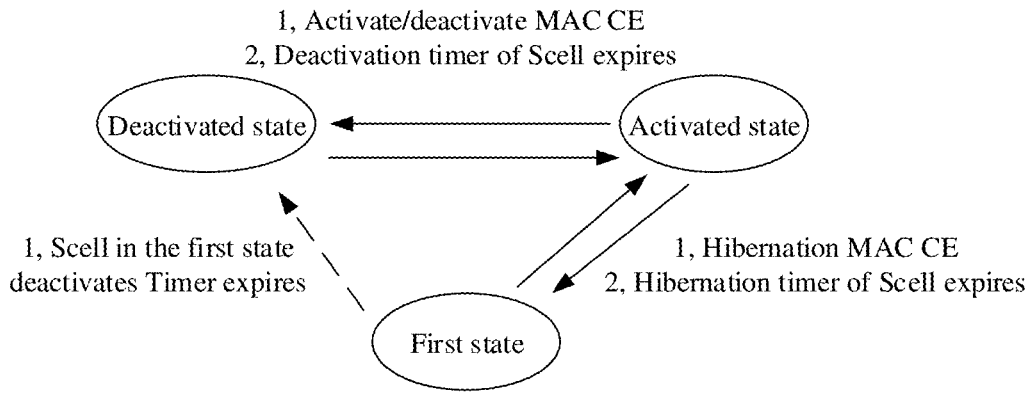

FIG. 14

Transmit configuration information to the terminal device, where the configuration information is used to instructing the first secondary cell entering the first state to the terminal device, the first state is a state in which the terminal device is capable for performing measurement and does not perform data reception and transmission. The terminal device is served by a primary cell and at least one secondary cell, and the first secondary cell is one of the at least one secondary cell    31

FIG. 15

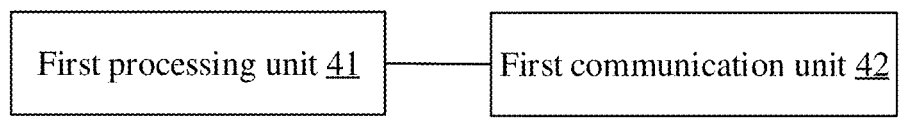

FIG. 16

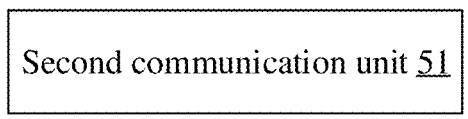

FIG. 17

MEASUREMENT CONTROL METHOD, TERMINAL DEVICE, AND NETWORK DEVICE

CROSS REFERENCE TO RELATED APPLICATION

This application is a continuation of International Patent Application No. PCT/CN2019/073538 filed on Jan. 28, 2019, the disclosure of which is hereby incorporated by reference in its entirety.

BACKGROUND

Currently, with the pursuit of rates, latency, high-speed mobility and energy efficiency, as well as the diversity and complexity of services in future life, the 3GPP International Standard Organization has begun to develop 5G. In order to implement the deployment and commercial applications in 5G network as soon as possible, 3GPP first completed the first 5G version, that is, LTE-NR Dual Connectivity (EN-DC), by the end of December 2017. Here, LTE is used as a Master Node (MN) and a New Radio (NR) is used as a Secondary Node (SN), where the MN mainly has RRC control function and provides a control plane to the CN and the SN may configure secondary signaling.

In related art, there is no concept of a Bandwidth Part (BWP) in LTE, so the bandwidth measured by Channel Quality Indication (CQI) is based on the entire bandwidth of a cell. However, a concept of the BWP is introduced in the New Radio (NR), and for the purpose of saving power of UE, data is transmitted only on one of the BWPs after the carrier is reactivated. However, it is not necessary to perform measurements on all BWPs (at most 4 DL BWPs configured). Therefore, how to determine to perform measurement on a certain BWP is a problem to be solved.

SUMMARY

The present disclosure relates to the technical field of information processing, and particularly, to a method for measurement control, a terminal device, and a network device.

According to a first aspect, a method for measurement control is provided, which is applied to a terminal device served by a primary cell and at least one secondary cell, and the method includes the following operations. A first secondary cell that in a first state is determined, where the first state is a state where the terminal device is capable of performing measurement and does not perform data reception and transmission, and the first secondary cell is one of the at least one secondary cell. A target BWP for the first secondary cell in the first state is determined. Measurement is performed on the target BWP.

According to a second aspect, a terminal device is provided, which is served by a primary cell and at least one secondary cell. The terminal device includes a processor. The processor is configured to determine a first secondary cell that is in a first state, where the first state is a state in which the terminal device is capable of performing measurement and does not perform data reception and transmission, and the first secondary cell is one of the at least one secondary cell; determine a target BWP for the first secondary cell in the first state; and perform measurement on the target BWP. The terminal device is served by a primary cell and at least one secondary cell. The first secondary cell is one of the at least one secondary cell.

According to a third aspect, a network device is provided. The network device includes a transceiver. The transceiver is configured to transmit configuration information to a terminal device, where the configuration information is used to indicate a first secondary cell being able to enter the first state to the terminal device, the first state is a state in which the terminal device is capable of performing measurement and does not perform data reception and transmission.

BRIEF DESCRIPTION OF THE DRAWINGS

FIG. 14 is a schematic diagram of state transition.

FIG. 15 is the fourth schematic flowchart of a method for measurement control according to embodiments of the present disclosure.

FIG. 16 is a schematic structural diagram of a terminal device according to embodiments of the present disclosure.

FIG. 17 is a schematic structural diagram of a network device according to embodiments of the present disclosure.

DETAILED DESCRIPTION

In order to be able to understand the features and technical contents of the embodiments of the present disclosure in more detail, the implementation of the embodiments of the present disclosure will be described in detail with reference to the accompanying drawings, which are provided for purposes of illustration only and are not intended to limit the embodiments of the present disclosure.

The technical solutions in the embodiments of the present disclosure will be described with reference to the accompanying drawings of the embodiments of the present disclosure. It will be apparent that the described embodiments are part of, but not all, embodiments of the present disclosure. Based on the embodiments in the present disclosure, all other embodiments obtained by a person of ordinary skill in the art without creative work fall within the scope of the present disclosure.

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Frequency Division Duplex (FDD) system, an Time Division Duplex (TDD) system, a Universal Mobile Telecommunication System (UMTS) system, a Worldwide Interoperability for Microwave Access (WiMAX) communication system, or a 5G system.

Figure 1A:
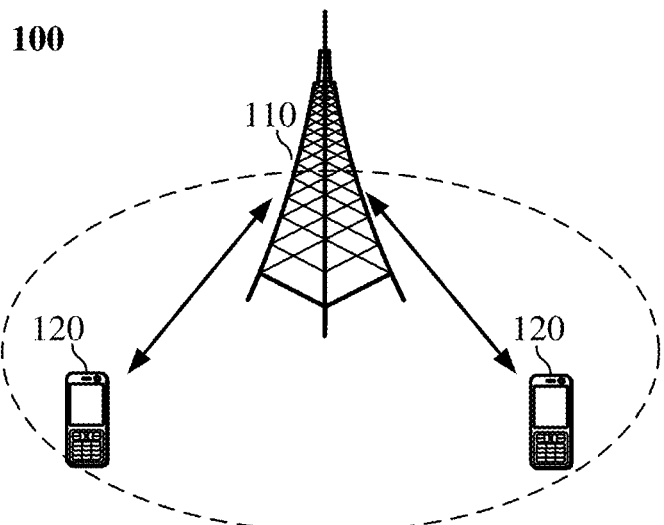
FIG. 1A is the first schematic diagram of communication system architecture according to embodiments of the present disclosure.

Illustratively, a communication system 100 applied in the embodiments of the present disclosure may be shown in FIG. 1A. The communication system 100 may include a network device 110, which may be a device that communicates with terminal devices 120 (or referred to as a communication terminal, a terminal). The network device 110 may provide communication coverage for a particular geographic area and may communicate with terminal devices located within the coverage area. Alternatively, the network device 110 may be a Base Transceiver Station (BTS) in a GSM system or a CDMA system, NodeB (NB) in a WCDMA system, Evolutional Nodes B (eNB or eNodeB) in an LTE system, or a radio controller in a Cloud Radio Access Network (CRAN), or the network device may be mobile switching center, relay stations, access points, vehicle-mounted devices, wearable devices, hubs, switches, network bridge, routers, network-side devices in a 5G network, network devices in a Public Land Mobile Network (PLMN), or the like.

The communication system 100 also includes at least one terminal device 120 located within coverage of the network device 110. As used herein, "terminal device" includes, but is not limited to, connections via wired lines, such as connection via a Public Switched Telephone Networks (PSTN), a Digital Subscriber Line (DSL), a digital cable, a direct cable, and/or another data connection/network; and/or via a wireless interface, e.g., for cellular networks, Wireless Local Area Network (WLAN), digital television networks such as DVB-H networks, satellite networks, AM-FM broadcast transmitters, and/or apparatus of another terminal device configured to receive/transmit communication signals, and/or Internet of Things (IoT) devices. A terminal device configured to communicate through a wireless interface may be referred to as a "wireless communication terminal", "wireless terminal" or "mobile terminal". Examples of mobile terminal include, but are not limited to, satellite or cellular telephones, a Personal Communications System (PCS) terminal that may combine a cellular radio telephone with data processing, facsimile, and data communication capabilities, a PDA that may include a radio telephone, a pager, Internet/Intranet access, a web browser, a notebook, a calendar, and/or a Global Positioning System (GPS) receiver, and conventional laptop and/or palmtop receivers or other electronic devices including radio telephone transceivers. The terminal device may refer to an access terminal, a User Equipment (UE), a subscriber unit, a subscriber station, a mobile station, a mobile station, a remote station, a remote terminal, a mobile device, a user terminal, a terminal, a wireless communication device, a user agent, or a user device. The access terminal may be a cellular telephone, a cordless telephone, a Session Initiation Protocol (SIP) telephone, a Wireless Local Loop (WLL) station, a Personal Digital Assistant (PDA), a handheld device and a computing device having a wireless communication function, or other processing device connected to a wireless modem, a vehicle-mounted device, a wearable device, a terminal device in a 5G network, a terminal device in a future evolved PLMN, or the like.

Alternatively, Device to Device (D2D) communication may be performed between the terminal devices 120.

Alternatively, the 5G system or the 5G network may also be referred to as a New Radio (NR) system or an NR network.

FIG. 1A illustrates one network device and two terminal devices. Alternatively, the communication system 100 may include a plurality of network devices and other numbers of terminal devices may be included within the coverage area of each network device, which is not limited by the embodiments of the present disclosure.

Alternatively, the communication system 100 may further include other network entities such as a network controller, a mobility management entity, and the like, which are not limited in the embodiments of the present disclosure.

It should be understood that devices having a communication function in a network/system in embodiments of the present disclosure may be referred to as communication devices. As an example of the communication system 100 shown in FIG. 1A, the communication device may include a network device 110 and terminal devices 120 having a communication function, and the network device 110 and the terminal devices 120 may be specific devices as described above, and details are not described herein. The communication devices may also include other devices in the communication system 100, such as network controller, mobility management entities, and other network entities, which are not limited in the embodiments of the present disclosure.

Figure 1B:
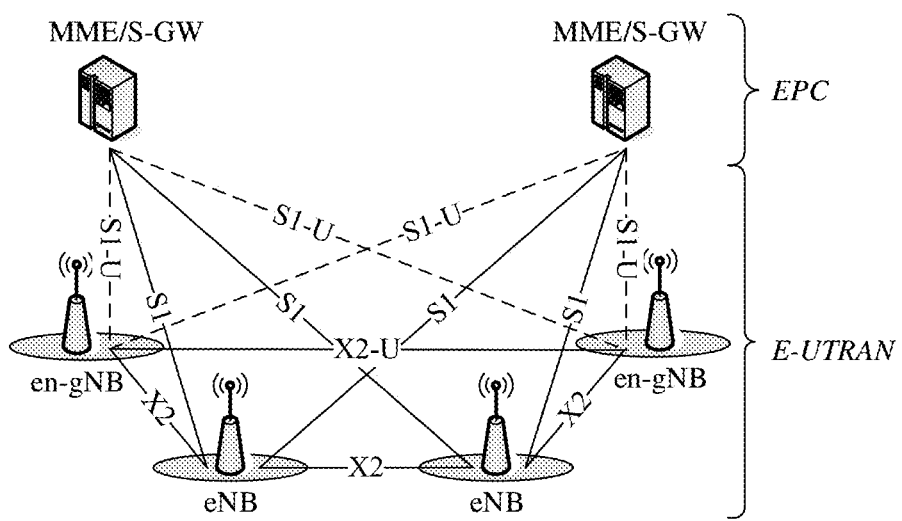
FIGS. 1B to 1E are several network architectures for dual connectivity.
Figure 1C:
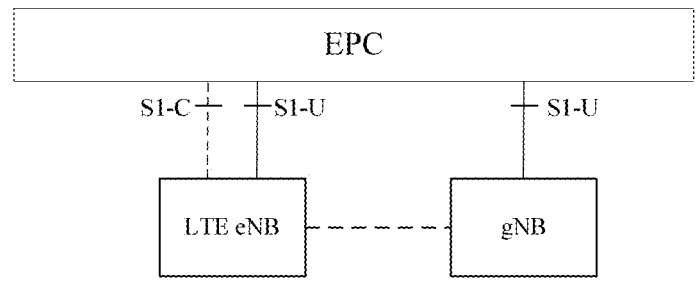
Figure 1D:
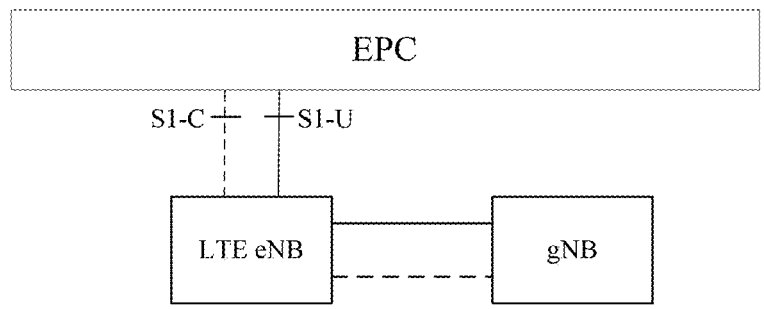

In order to implement the deployment and commercial applications in 5G network as soon as possible, 3GPP first completed the first 5G version, that is, LTE-NR Dual Connectivity (EN-DC), by the end of December 2017. Here, LTE is used as Master Node (MN), SN is used as Secondary Node (SN), and network deployment and networking architectures are shown in FIGS. 1B, 1C, and 1D.

MN mainly has RRC control function and provides a control plane to the CN, and the SN may configure secondary signaling, such as SRB3, mainly providing a data transmission function.

Figure 1E:
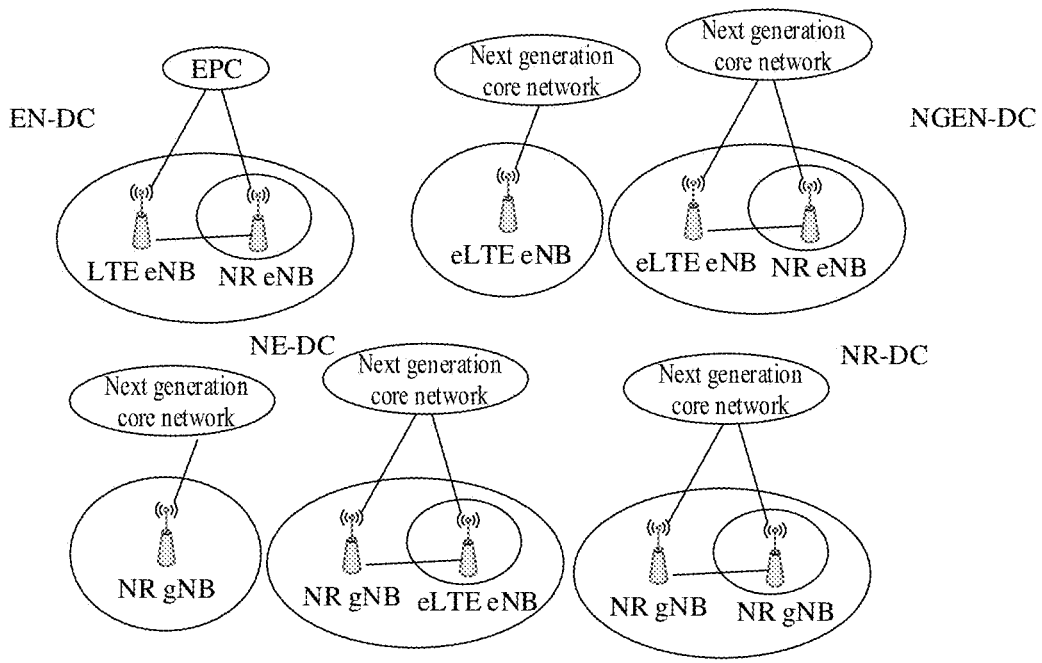

At the end of R15, other DC modes, i.e. NE-DC, 5GC-EN-DC, NR DC will be supported. For the EN-DC, a core network connected to the access network is an EPC, while the core network connected to other DC modes are 5GC, as shown in FIG. 1E. It should be noted that NR may also be deployed independently.

It should be understood that the terms "system" and "network" are used interchangeably herein. The term "and/or," as used herein, is merely an association that describes an associated object, meaning that there may be three relationships, e.g., A and/or B may represent three conditions: i.e., independent existence of A, existence of both A and B, and independent existence of B. In addition, the character "/" generally indicates that relationship between the associated objects is "or".

In order to understand the features and technical contents of the embodiments of the present disclosure in more detail, the implementation of the embodiments of the present disclosure will be described in detail with reference to the accompanying drawings, which are provided for purposes of illustration only and are not intended to limit the embodiments of the present disclosure.

Embodiment 1

Figure 2:
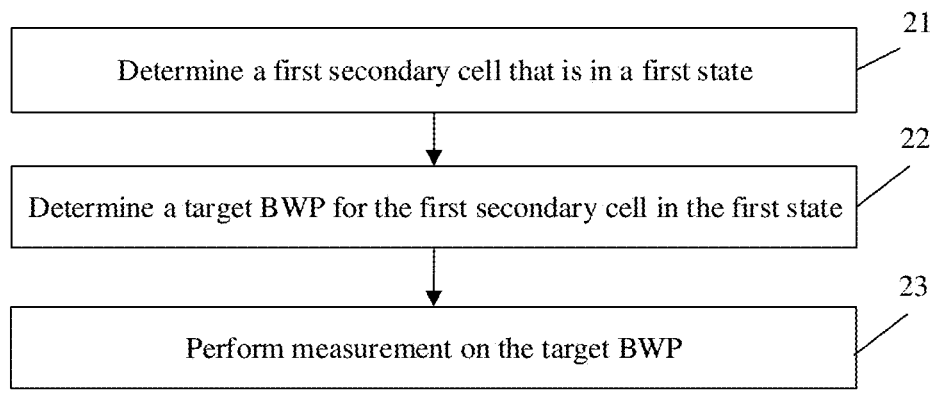
FIG. 2 is the first schematic flowchart of a method for measurement control according to embodiments of the present disclosure.

The embodiment provides a method for measurement control, applied to a terminal device that is served by a primary cell and at least one secondary cell. As shown in FIG. 2, the method includes the following steps.

At Step 21, a first secondary cell in a first state is determined. The first state is a state in which the terminal device is capable of performing measurement and does not perform data reception and transmission. The first secondary cell is one of the at least one secondary cell.

At Step 22, a target bandwidth part (BWP) is determined for the first secondary cell in the first state.

At Step 23, measurement is performed on the target BWP.

Figure 3:
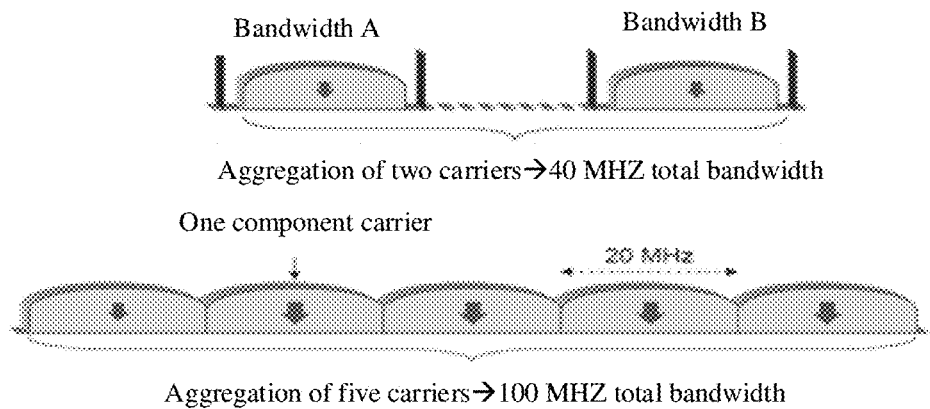
FIG. 3 is a schematic diagram of carrier aggregation.

The embodiment may be applied in a scenario where the Carrier Aggregation (CA) technology is supported in the 5G. As shown in FIG. 3, the CA enables the NR system to support a larger bandwidth by jointly scheduling and using resources on a plurality of Component Carriers (CC), thereby enabling to implement a higher peak rate of the system. According to the continuity of the aggregated carriers in the frequency spectrum, CA may be divided into continuous carrier aggregation and non-continuous carrier aggregation. CA may be divided into Intra-band carrier aggregation and inter-band carrier aggregation according to whether the bands in which the aggregated carriers are located are the same.

The Primary Cell Component (PCC) is referred to as a primary carrier, and the PCC has one and only one. The PCC provides an RRC signaling connection, a NAS function, security, and the like. PUCCH is present on the PCC and only on the PCC. Secondary Cell Component (SCC) is referred to as a secondary carrier, and SCC provides only additional radio resources. PCC and SCC are both referred to as serving cells. It is also specified in the standard that aggregation of at most five carriers are supported, that is, the maximum bandwidth after aggregation is 100 MHZ, and the aggregated carriers belong to the same base station. When all the aggregated carriers use the same cell Radio Network Temporary Identifier (C-RNTI), the base station ensures that collision of C-RNTIs does not occur in the cell where each carrier is located. Since both asymmetric carrier aggregation and symmetric carrier aggregation are supported, it is required that aggregated carriers in downlink are necessary and there may be no aggregated carrier in uplink. Moreover, for a primary cell corresponding to the primary carrier, there must be a PDCCH and PUCCH of the cell, and only a cell corresponding to the primary carrier has the PUCCH, and secondary cells corresponding to other secondary carriers may have the PDCCH.

Figure 4A:
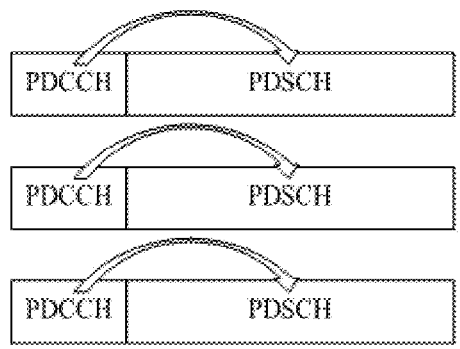
FIG. 4A is a diagram of cross-carrier scheduling and co-carrier scheduling.
Figure 4B:
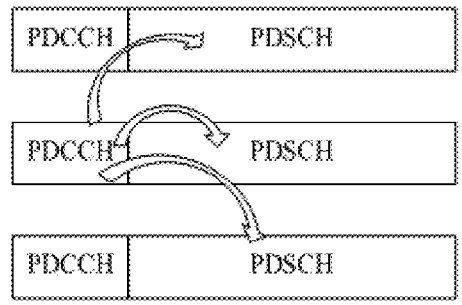
FIG. 4B is a diagram of cross-carrier scheduling and co-carrier scheduling.

As shown in FIG. 4, in aggregation of carriers, the scheduling for each carrier is divided into co-carrier scheduling (FIG. 4A) and cross-carrier scheduling (FIG. 4B) according to the carriers in which the PDCCH resources used for scheduling are located. The same-carrier scheduling means that scheduling information of each carrier is carried in a PDCCH of its own carrier for scheduling. For cross-carrier scheduling, the scheduling information of three carriers is carried on one carrier for scheduling. The introduction of cross-carrier scheduling is based on avoidance of interference in heterogeneous networks.

In the cross-carrier scheduling, scheduling information for different carriers is distinguished by Carrier Indicator Field (CIF) in DCI. CIF is used to indicate the serial number of the carriers, which is fixedly represented by 3 bit and in the range of 0 to 7. The CIF of the PCC is fixed to 0. There may be multiple carriers with PDCCH, but the PCC must have its own PDCCH. PDCCH of a carrier used by the current SCC for scheduling is configured through high layer.

In the embodiment, description is made mainly to the secondary cell (SCell). The Scell is configured by RRC dedicated signaling. The secondary cell is initially configured to be a deactivated state, in which data reception and transmission cannot be performed. The data reception and transmission can be performed after the SCell is activated by the MAC CE. This architecture is not an optimal architecture from the perspective of SCell configuration and latency of activation. This latency, in turn, reduces the efficiency of CA usage and radio resources, particularly in small cell deployment scenarios. In the dense small cell deployment scenario, the signaling load of each Scell is also large, particularly in the case where each Scell needs to be configured separately. Therefore, the current CA architecture introduces additional latency, restricts the use of CA, and reduces the gain of CA load sharing.

The first state introduced in the present embodiments may be understood as the dormant state. Further, the state of cell may be divided into activated state and deactivated state, and in order to accelerate the restoration of the cell, a new cell state, also called a first state (i.e., dormant state) is defined. In the first state, the terminal device is capable of performing measurement and report CQI and Radio Resource Management (RRM) measurement, but does not decode a Physical Downlink Control Channel (PDCCH).

Figure 5A:
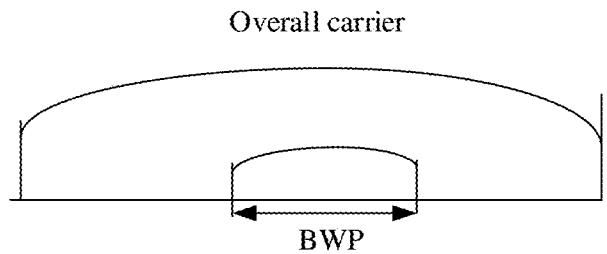
FIG. 5A is a schematic diagram of BWP.
Figure 5B:
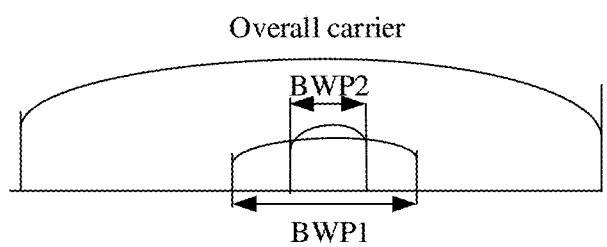
FIG. 5B is a schematic diagram of BWP.
Figure 5C:
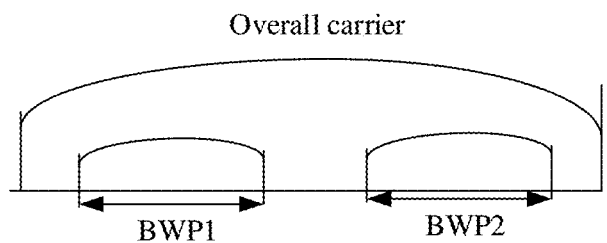
FIG. 5C is a schematic diagram of BWP.

BWP as mentioned in the above solution is described as follows. The maximum channel bandwidth may be 400 MHZ (wideband carrier) in 5G, which is large compared to the maximum bandwidth of 20 MHZ in LTE. If the terminal device remains operating on a wideband carrier, the power consumption of the UE is large. It is therefore suggested that the RF bandwidth of the terminal device may be adjusted according to the actual throughput of the UE. In view of this, the motive for introducing the BWP is to optimize the power consumption of the terminal device. For example, if the speed of the terminal device is low, a smaller bandwidth may be configured for the terminal device (FIG. 5A), and if the speed of the terminal device is high, a larger bandwidth may be configured for the terminal device (FIG. 5B). If the terminal device supports a high rate, or operates in a Carrier Aggregation (CA) mode, a plurality of BWPs may be configured (FIG. 5C) for the terminal device. Another purpose of BWP is to trigger the coexistence of multiple numerologies in a cell.

A terminal device may be configured with at most four Up Link (UL) BWPs and at most four Down Link (DL) BWPs by the RRC dedicated signaling, but only one DL BWP and one UL BWP can be activated at the same time. A first active BWP in the configured BWP may be indicated in the RRC dedicated signaling. Meanwhile, when the terminal device is in the connected state, it is also possible to switch between different BWPs through DownLink Control Information (DCI).

The procedure of Radio Link Monitor (RLM) is only performed on the active BWP, and the inactive BWP is not required. When switching between different BWPs, it is not needed to reset the RLM-related timer and counter. For Radio Resource Management (RRM) measurement, the RRM measurement is not affected regardless of reception and transmission of data is performed on which active BWP. For CQI measurement, the terminal device also only needs to perform it on the active BWP.

In NR, the Channel Quality Indication (CQI) is mainly used to measure the quality of a downlink channel of a cell, which is measured and reported by the terminal device. The terminal device measures a corresponding pilot signal according to a high-layer indication, and then reports a CQI report to the network side. The network side determines whether to adjust the modulation mode, resource allocation, and other related configurations of the terminal device according to the CQI measurement report reported by the terminal device and the current resource situation of network.

In NR, the signal for the CQI measurement is a Channel State Information Reference Signal (CSI-RS), which is configured by the network side to the terminal device to control whether to perform the CQI measurement.

The reporting mode of CQI measurement may include: periodic CQI reporting and aperiodic CQI reporting. For the periodic CQI reporting, the period is configured by the network side. The aperiodic CQI reporting is performed by DCI indication. The CQI reporting indicated by the DCI may also be periodic reporting, and the period is configured in the RRC signaling. CQI transmission channel may be divided into Physical Uplink Shared Channel (PUSCH) and Physical Uplink Control Channel (PUCCH). For subframes with no PUSCH allocated, a period CQI/PMI/RI reporting is transmitted on the PUCCH. For a subframe allocated with PUSCH, periodic reporting is transmitted on the PUSCH in the manner of channel-associated signaling. If the periodic reporting and the aperiodic reporting would occur in the same subframe, the UE only can transmit the aperiodic reporting in this subframe.

Based on the above description, an embodiment provides the following specific processing scenarios.

Scenario 1:

The measurement is performed on a specified BWP in a protocol-specified manner.

Before a first secondary cell in a first state is determined, the method further includes the following operations.

Configuration information is received, and a first secondary cell entering a first state is determined based on the configuration information.

The operation that the configuration information is received includes the following operation. Radio Resource Control (RRC) signaling transmitted from a network device is received and the configuration information carried in the RRC signaling is obtained.

Figure 6:
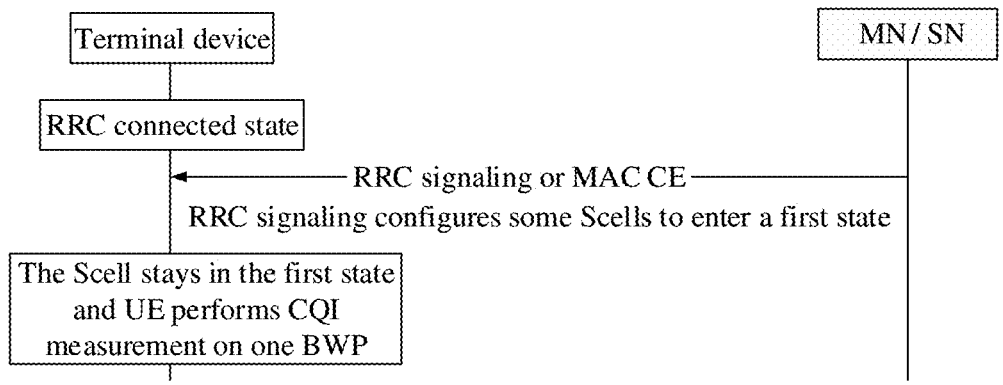
FIG. 6 is the second schematic flowchart of a method for measurement control according to embodiments of the present disclosure.

For example, referring to FIG. 6, when the terminal device is in an RRC connected state, the terminal device receives RRC signaling or an MAC CE from the network device, such as a Master Node (MN) or a Secondary Node (SN), configures the first secondary cell to enter the first state through the RRC signaling. Then, the terminal device controls the secondary cell (i.e., the first secondary cell) to remain in the first state, and performs CQI measurement on one BWP, that is, the target BWP as described above.

The RRC signaling further includes at least two BWPs configured by the network device for the terminal device.

Specifically, the operation that the target BWP for the first secondary cell in the first state is determined includes one of the following operations.

The target BWP for the first secondary cell in the first state is determined based on the target BWP indicated by the network device carried in the RRC signaling. That is, Scell is configured by the RRC signaling to enter the dormant state, and at the same time, at most four BWPs are configured and the identification (id) of the first activated BWP by the RRC signaling is indicated by the RRC signaling. The first activated BWP is the BWP on which the UE performs the CQI measurement on the dormant carrier.

A BWP on which the RRC signaling is received is used as the target BWP of the first secondary cell in the first state. That is, the Scell is configured by the RRC signaling to enter the dormant state, and at the same time, at most four BWPs are configured by the RRC signaling. The BWP for receiving the RRC message is the BWP on which UE performs CQI measurement on the dormant carrier. The BWP for receiving the message is the BWP on which CQI measurement is performed.

Alternatively, other explicit signaling may also be used to indicate that the BWP is a BWP on which UE performs CQI measurement on the dormant carrier.

Scenario 2, it differs from scenario 1 in that the first secondary cell is instructed to enter the first state by the MAC CE in this scenario.

Specifically, a first secondary cell entering a first state is determined by the following operations.

Configuration information is received, and the first secondary cell being able to enter the first state is determined based on the configuration information. The configuration information is received by the following operation.

RRC signaling from a network device is received by the terminal device, and the configuration information carried in the RRC signaling is obtained.

The above is similar to scenario 1, that is, the configuration information is obtained through the RRC signaling from the network device. The configuration information may include information of at least one secondary cell configured for a terminal device by a network device, such as MN or SN, and information of BWP of each secondary cell. The BWP information of each secondary cell may be information of at least two BWPs configured by the network device. The MN may provide coverage range of the primary cell and the SN may provide coverage range of the secondary cell.

After the RRC signaling from the network device is received by the terminal device, the method further includes the following operation.

A control instruction from the network device is received by the terminal device. The control instruction is used for instructing each secondary cell of the terminal device to enter the first state. The control instruction is transmitted through a first MAC CE.

That is, after the secondary cell enters the activated state, the configuration information carried in the RRC signaling is received by the terminal device, then a control instruction from the MAC CE is received, and it is determined that the first secondary cell enters the first state according to the indication of the control instruction.

Figures 7, 8, 9, 10:
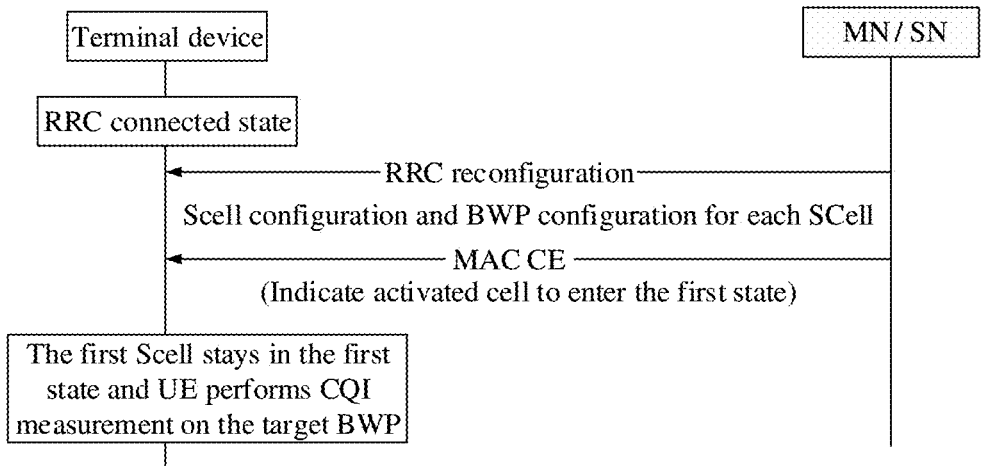
FIG. 7 is the third schematic flowchart of a method for measurement control according to embodiments of the present disclosure.
FIG. 8 is the first schematic diagram of a format of an MAC CE.
FIG. 9 is the second schematic diagram of a format of an MAC CE.
FIG. 10 is the third schematic diagram of a format of an MAC CE.

As shown in FIG. 7, the terminal device receives RRC signaling from the MN or the SN, where the RRC signaling includes the configuration of secondary cells and the configuration of the BWP for each secondary cell, and thus the terminal device acquires the configuration information of the secondary cell (SCell) from the configuration in the RRC signaling. The terminal device receives a MAC CE indication that instructs the terminal device to enter the first state, i.e., the dormant state. Thereafter, the terminal device enters and remains in the first state, and performs measurement on the target BWP, where the measurement specifically may be CQI measurement and/or RRM measurement.

The target BWP for the first secondary cell in the first state is determined by one of the following operations.

A BWP on which the first MAC CE is received is used as the target BWP of the first secondary cell in the first state. That is, the BWP on which the terminal device receives the MAC CE is BWP on which the CQI measurement is performed on the dormant carrier.

A default BWP configured by the network device is used as the target BWP of the first secondary cell in the first state, That is, the default BWP configured on the network side is the BWP on which UE performs CQI measurement on the dormant carrier.

An initial BWP configured by a network device is used as the target BWP of the first secondary cell in the first state. That is, the initial BWP configured on the network side is the BWP on which UE performs CQI measurement on the dormant carrier.

A second MAC CE from a network device is received by the terminal device, and the target BWP of the first secondary cell in the first state is determined based on the second MAC CE. The second MAC CE is different from the first MAC CE. That is, a new MAC CE is received by the terminal device, and the MAC CE indicates that a BWP is the BWP on which UE performs CQI measurement on the dormant carrier. It should be noted that the second MAC CE received in the embodiment may be a second MAC CE received in the activated state.

The target BWP is determined according to an indication of the RRC signaling. That is, the BWP where CQI measurement is performed on the dormant carrier is explicitly indicated by the RRC signaling. The RRC signaling may be a newly sent RRC signaling, or may be a RRC signaling for sending configuration information. When the RRC signaling is the RRC signaling for sending configuration information, it may be understood that the RRC signaling may further indicate the target BWP in addition to the configuration information included therein.

An indicated target BWP for the first secondary cell in the first state is obtained in the first MAC CE. That is, in the MAC CE instructing the UE to enter the first state (i.e., dormant state), the BWP is indicated as a BWP where the CQI measurement is performed on the dormant carrier.

At least two BWPs configured by the network device and a first active BWP indicated by the network device are obtained by the RRC signaling, and the first active BWP is used as the target BWP for the first secondary cell in the first state. For example, at most four BWPs are configured and identification information (ID) of the first active BWP is indicated by the RRC signaling, and the first active BWP is the target BWP where the terminal device performs the CQI measurement on the dormant carrier.

Further, the target BWP of the first secondary cell in the first state is determined based on the second MAC CE by the following operations. Related information of BWPs indicated by the second MAC CE is determined based on information included in N bits of the second MAC CE, and the target BWP is determined based on the related information of the BWPs, where N is an integer greater than or equal to 2.

The value of N may be set according to the actual situation. For example, when the number of BWPs does not exceed 4, N may be 2.

The target BWP is determined based on the related information of the BWPs by the following operations.

When the number of configured BWPs is not greater than M and the related information is identification of the BWP, the target BWP is determined based on the identification of the BWP. M is an integer less than or equal to a preset number.

When the number of configured BWPs is greater than M and the related information is the identification of the BWP, the target BWP is determined by subtracting a first value from the identification of the BWP.

When the related information is an order value of a BWP, the target BWP is determined based on the order value of the BWP.

The value of M may be set according to the actual situation, and it may be four, or, it may also be other configurations, which will not be exhaustive in the embodiment.

The N bits of the second MAC CE are N bits of the same position in the N bytes respectively. Or the N bits in the second MAC CE are consecutive N bits.

The following describes design of MAC CE according to a scenario of at most 7 carriers, where DCI indicates BWP 0-3, the actual value of which is 1 to 4, that is, the value of M as described above is 4, and the value of N is 2.

Descriptions will be made firstly for N bits in the second MAC CE being N bits of the same position in N bytes respectively.

If the number of configured BWPs is less than or equal to 3, N is 2. The two C1 bits of the two bytes shown in FIG. 8 correspond to the BWP id on which CQI measurement is performed on a carrier (i.e., the first secondary cell) having the smallest index, in the SCell in the first state (i.e., the dormant state). If the number of the configured BWPs is 4, the two C1 bits correspond to the BWP id-1 on which UE performs CQI measurement on the carrier (i.e., in the first secondary cell) having the smallest index, in the SCell in dormant state. That is, since the identification of the configured 4 BWPs may be 0-3, the value obtained based on the two C1 bits may be 1-4, and in this case, corresponding identification of the target BWP is obtained by subtracting 1 from the identification value determined based on C1. As another example, order number indexes of BWPs may be configured. That is, when the BWP is configured for the terminal device through the RRC signaling, a list may be configured and different BWPs have corresponding order numbers in the list. Then, the value calculated by the two bits for C1 may correspond to an order value in the list, and the BWP indicated by the order value is the target BWP.

Contents corresponding to the two bits can refer to Table 1 below:

| CCi 2-bits | BWP |
|---|---|
| 00 | First bandwidth configured by higher layer |
| 01 | Second bandwidth configured by higher layer |
| 10 | Third bandwidth configured by higher layer |
| 11 | Fourth bandwidth configured by higher layer |

CC1, cc2•••cci••• have one-to-one correspondence with identifications (ids) indicating a Scell in the first state in ascending order, or in descending order, which is not limited herein.

A LCID is defined for the newly introduced logical channel id to identify this MAC CE.

Descriptions will be made again for N bits in the second MAC CE being are consecutive N bits. Similarly, taking 7 carriers as an example, referring to FIG. 9, the positions of the two bits CCi correspond to consecutive two bits. It should be understood that the processing mode is the same when more carriers exist, except that the values of the above M and N need to be adjusted according to actual situations, which will not be exhaustive in the embodiment.

The format of the first MAC CE may be described as follows.

The L bytes in the first MAC CE include an indication bit indicating whether at least one secondary cell enters the first state, where L is an integer greater than or equal to 1. One byte, other than the L bytes, in the first MAC CE includes at least one set of consecutive N bits, where N is an integer greater than or equal to 2. Each group of N bits is used to indicate related information of BWPs for the corresponding secondary cell.

In the following example, the first byte of the MAC CE represents an indication bit indicating that the carrier enters the dormant state. For example, C3=1 indicates that a Scell corresponding to the Scellindex enters the dormant state. Assuming that three carriers enter the dormant state, then Cx, Cy, and Cz have one-to-one correspondence with Scellindexs for the Sscell in the Dormant state in ascending order.

The target BWP of the first secondary cell in the first state is determined by the following operations.

When the number of configured BWPs is not greater than M and the related information is an identification of the BWP, the target BWP of the first secondary cell in the first state is determined based on the identification of the BWP. M is an integer less than or equal to a preset number.

When the number of configured BWPs is greater than M and the related information is the identification of the BWP, the target BWP of the first secondary cell in the first state is determined by subtracting a first value from the identification of the BWP.

When the related information is an order value of BWP, the target BWP is determined based on the order value of the BWP.

Referring to FIG. 10, if the number of configured BWPs is less than or equal to 3, the two Cxbits correspond to the id of the BWP on which UE performs CQI measurement on the carrier with the smallest index in the SCell in the dormant state. If the number of configured BWPs is 4, the two Cxbits correspond to id of the BWP on which UE performs CQI measurement on the carrier with the smallest index in the SCell in the dormant state minus 1 (i.e., BWP id-1), or correspond to the order index of the configured BWP, which can similarly refer to Table 1 and will not elaborated herein.

It should be noted that in the first MAC CE, if the 8 bits are not fully occupied, R is filled in as a reservation bit, or 0 is filled in to complete the 8 bits.

Figures 11, 12, 13:
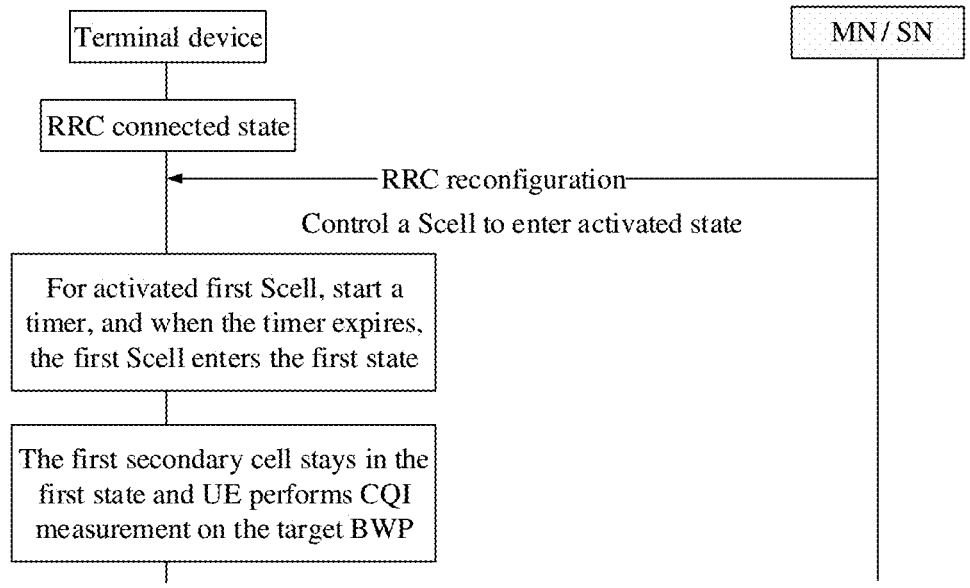
FIG. 11 is the fourth schematic diagram of a format of an MAC CE.
FIG. 12 is the fifth schematic flowchart of a method for measurement control according to embodiments of the present disclosure.
FIG. 13 is the fifth schematic diagram of a format of an MAC CE.

In the case of carrier aggregation of 32 carriers, the format of the first MAC CE may be as shown in FIG. 11, where four bytes are used to indicate whether the carrier of each cell enters the first state or not, and the other byte is used to indicate the target BWP of the secondary cell entering the first state.

Scenario 3: A first secondary cell is controlled to enter a first state based on a timer. The details are described as follows.

When the first secondary cell is in the activated state, a timer is started. If the timer expires, it is determined that the first secondary cell enters the first state.

As shown in FIG. 12, the terminal device is in the RRC connected state and receives an RRC reconfiguration message from the MN or SN to determine that the secondary cell enters the activated state. It may be understood that in the embodiment, the first secondary cell is controlled to enter the activated state. For the active carrier (i.e., the first secondary cell), a timer for controlling the terminal device to automatically enter the first state, (i.e., the dormant state) is started. If the timer expires, the first secondary cell for the terminal device enters the first state. The first state is maintained in the first secondary cell, and measurement is performed on the target BWP. In particular, the measurement may be CQI measurement or RRM measurement.

The target BWP of the first secondary cell in the first state is determined by one of the following operations.

A BWP on which the terminal device is located when the timer expires is used as the target BWP of the first secondary cell in the first state. For example, the BWP located when the timer expires is used as the BWP on which the CQI measurement is performed on the dormant carrier.

A default BWP configured based on the network device is used as the target BWP of the first secondary cell in the first state.

An initial BWP configured by the network device is used as the target BWP of the first secondary cell in the first state.

A second MAC CE from the network device is received by the terminal device, and the target BWP of the first secondary cell in the first state is determined based on the second MAC CE. The second MAC CE is different from the first MAC CE.

The target BWP of the first secondary cell in the first state is determined based on an indication of RRC signaling.

A first active BWP indicated by RRC signaling is used as the target BWP of the first secondary cell in the first state. For example, at most four BWPS is configured and id (identification information) of the first active BWP is indicated by the RRC signaling. The first active BWP is the target BWP on which the CQI measurement is performed on the first secondary cell in the dormant state.

The target BWP of the first secondary cell in the first state is determined based on the second MAC CE by the following operations.

The related information of BWP indicated by the second MAC CE is determined based on information included in N bits of the second MAC CE. The target BWP is determined based on the related information of the BWP. N is an integer greater than or equal to 2.

The target BWP of the first secondary cell in the first state is determined based on the related information of the BWP by the following operations.

When the number of configured BWPs is not greater than M and the related information is identification of the BWP, the target BWP is determined based on the identification of the BWP. M is an integer less than or equal to a preset number.

When the number of configured BWPs is greater than M and the related information is the identification of the BWP, the target BWP is determined by subtracting a first value from the identification of the BWP.

When the related information is an order value of a BWP, the target BWP is determined based on the order value of the BWP.

The N bits in the second MAC CE are N bits in same position of the N bytes. Or, the N bits in the second MAC CE are consecutive N bits.

The description of the format of the second MAC CE is the same as that in Scenario 2, and details are not described herein.

In connection with the above multiple scenarios, the operation that the measurement is performed on the target BWP in the embodiment includes: performing CQI measurement and/or RRM measurement on the target BWP. Specific measurement modes are not limited in the embodiment.

It should also be noted that the embodiment may further provide a manner in which the above processing may be used for CQI measurement, but for the RRM measurement, it may be performed according to the configuration of RRC signaling. For example, it is directly indicated in the RRC signaling that the RRM measurement is performed on a certain BWP without using the above processing for BWP determination.

In the above solution, the state transition, i.e., transition between the activated state and the first state, may be controlled by the first MAC CE or the second MAC CE. It may be set 1 to indicate the dormant state, and 0 to indicate the activated state, for example, with reference to the format of the second MAC CE shown in FIG. 13. In addition, referring to FIG. 14, the transition among the activated state, the deactivated state and the first state is shown. In the RRC signaling, the state of the Scell may be configured to be the activated state or the dormant state, and the deactivated state is defaulted. In order to quickly restore the SCell, the solution provided by the embodiment introduces the first state, i.e., the dormant state.

By using the above solution, the terminal device can be controlled to enter a first state in which the terminal device only performs measurement and does not perform data processing, and the terminal device is enabled to perform measurement on the target BWP. In this way, the terminal device can provide a reliable measurement result to the network side while saving power, thereby ensuring the accuracy of scheduling the terminal device, and improving the system capacity and the throughput of the terminal device.

Embodiment 2

The present embodiment provides a method for measurement control, applied to a network device, and as shown in FIG. 15, including the following steps.

In step 31, configuration information is transmitted to the terminal device. The configuration information is used to indicate the first secondary cell being able to enter the first state to the terminal device. The first state is a state in which the terminal device is capable for performing measurement and does not perform data reception and transmission. The terminal device is served by a primary cell and at least one secondary cell. The first secondary cell is one of the at least one secondary cell.

The embodiment may be applied in a scenario supporting the Carrier Aggregation (CA) technology in the 5G. As shown in FIG. 3, the CA enables the NR system to support a larger bandwidth by jointly scheduling and using resources on a plurality of Component Carriers (CCs), so as to implement a higher peak rate of the system. According to the continuity of the aggregated carriers in the frequency spectrum, CA may be divided into continuous carrier aggregation and non-continuous carrier aggregation. CA may be divided into Intra-band carrier aggregation and inter-band carrier aggregation according to whether the bands in which the aggregated carriers are located are the same.

The first state introduced in the embodiment may be understood as the dormant state. Furthermore, the state of cell may be divided into activated state and deactivated state, and in order to accelerate the restoration of the cell, a new cell state, i.e., the first state, namely dormant state, is defined. In the first state, the terminal device is capable of performing CQI measurement and report and RRM measurement, but does not decode a Physical Downlink Control Channel (PDCCH).

BWP as mentioned in the above solution is described as follows. The maximum channel bandwidth in 5G may be 400 MHZ (wideband carrier), which is large compared to maximum bandwidth of 20 MHZ in LTE. If the terminal device remains operating on a wideband carrier, the power consumption of the UE is large. It is therefore suggested that the RF bandwidth of the terminal device may be adjusted according to the actual throughput of the UE. In view of this, the motive for introducing the BWP is to optimize the power consumption of the terminal device. For example, if the speed of the terminal device is low, and a smaller bandwidth may be configured for the terminal device (FIG. 5A), and if the speed of the terminal device is high, a larger bandwidth may be configured for the terminal device (FIG. 5B). If the terminal device supports a high rate, or operates in a CA mode, a plurality of BWPs may be configured (FIG. 5C) for the terminal device. Another purpose of BWP is to trigger the coexistence of multiple numerologies in a cell.

Based on the above description, the present embodiment provides the following specific processing scenarios.

Scenario 1:

The measurement is performed on a specified BWP in a protocol-specified manner.

Specifically, the operation that the configuration information is transmitted to the terminal device includes the following operation.

RRC signaling is transmitted to terminal device. The RRC carries the configuration information.

For example, referring to FIG. 6, when the terminal device is in an RRC connected state, the terminal device receives RRC signaling or an MAC CE from the network device, such as a MN or a SN, configures the first secondary cell to enter the first state through the RRC signaling. Further, the terminal device controls the secondary cell (i.e., the first secondary cell) to remain in the first state, and performs CQI measurement on one BWP, that is, the target BWP as described above.

The RRC signaling further includes at least two BWPs configured by the network device for the terminal device.

The RRC signaling further carries a target BWP indicated by the network device.

Scenario 2 differs from the scenario 1 in that the first secondary cell is instructed to enter the first state by the MAC CE in this scenario. Specifically, similar to Scenario 1, the configuration information is obtained by RRC signaling from a network device. The configuration information may include: information of at least one cell configured for a terminal device by the network device, such as MN or SN, and information of BWP of each cell (especially the secondary cell). The BWP information of each cell or secondary cell may be at least two BWPs configured for the cell.

After the configuration information is transmitted by the network device to the terminal device, the method further includes the following operation.

A control instruction is transmitted to the terminal device. The control instruction is used for instructing each secondary cell of the terminal device to enter the first state. The control instruction is transmitted through the first MAC CE.

That is, after the secondary cell enters the activated state, the configuration information carried in the RRC signaling is received by the terminal device, then a control instruction from the MAC CE is received, and it is determined that the first secondary cell enters the first state according to the indication of the control instruction.

As shown in FIG. 7, the terminal device receives RRC signaling from the MN or the SN, where the RRC signaling includes the configuration of secondary cells and the configuration of the BWP for each secondary cell, and thus the terminal device acquires the configuration information of the secondary cell (SCell) from the configuration in the RRC signaling. The terminal device receives a MAC CE indication that instructs the terminal device to enter the first state, i.e., the dormant state. Thereafter, the terminal device enters and remains in the first state and performs measurement on the target BWP, where the measurement specifically may be CQI measurement and/or RRM measurement.

The method further includes one of the following operations.

A default BWP is configured for the terminal device.

An initial BWP is configured for the terminal device.

A second MAC CE is transmitted to the terminal device. The second MAC CE is used to enable the terminal device to determine a target BWP. The second MAC CE is different from the first MAC CE.

The target BWP is indicated by RRC signaling;

The target BWP is indicated by the first MAC CE.

At least two BWPs and an indicated first active BWP are configured for the terminal device via RRC signaling. Further, the N bits of the second MAC CE include related information of the indicated BWPs. N is an integer greater than or equal to 2.

The value of N as described above may be set according to the actual situation. For example, when the number of BWP does not exceed 4, N may be 2.

The N bits of the second MAC CE are N bits of the same position in the N bytes respectively. Or the N bits in the second MAC CE are consecutive N bits.

The following describes design of MAC CE according to a scenario of at most 7 carriers, where DCI indicates BWP 0-3, the actual value of which is 1 to 4, that is, the value of M as described above is 4, and the value of above N is 2.

Descriptions will be made firstly for N bits of the second MAC CE being N bits of the same position in N bytes respectively.

If the number of configured BWPs is less than or equal to 3, N is 2. The two C1 bits of the two bytes shown in FIG. 8 correspond to the identification (id) of the BWP on which CQI measurement is performed on a carrier (i.e., in the first secondary cell) having the smallest index, in the SCell in the first state (i.e., the dormant state). If the number of the configured BWPs is 4, the two C1 bits correspond to the id of the BWP id-1 on which CQI measurement is performed by UE on the carrier with the smallest index, in the SCell in dormant state. That is, since the identifications of the configured four BWPs may be 0-3, the value obtained based on the two C1 bits may be 1-4, and in this case, the identification of the target BWP is obtained by subtracting 1 from the identification value determined based on C1. As another example, order number indexes of BWPs may be configured. That is, a list may be configured when the BWP is configured for the terminal device through RRC signaling, a list may be configured and different BWPs have corresponding order numbers in the list. Then, the value calculated by the two bits for C1 may correspond to an order value in the list, and the BWP indicated by the order value is the target BWP.

Contents corresponding to the two bits may refer to Table 1 below.

| CCi 2-bits | BWP |
|---|---|
| 00 | First bandwidth configured by higher layers |
| 01 | Second bandwidth configured by higher layers |
| 10 | Third bandwidth configured by higher layers |
| 11 | Fourth bandwidth configured by higher layers |

CC1, cc2•••cci••• have one-to-one correspondence with identifications (ids) indicating a Scell in the first state in ascending order, or in descending order, which is not limited herein.

A LCID is defined for the newly introduced logical channel id to identify this MAC CE.

Descriptions will be made again for N bits in the second MAC CE being are consecutive N bits. Similarly, taking 7 carriers as an example, referring to FIG. 9, the positions of the two bits CCi correspond to consecutive two bits. It should be understood that the processing mode is the same when more carriers exist, except that the values of the above M and N need to be adjusted according to actual situations, which will not be exhaustive in the embodiment.

The format of the first MAC CE may be described as follows.

The L bytes in the first MAC CE include an indication bit indicating whether at least one secondary cell enters the first state. L is an integer greater than or equal to 1.

One byte, other than the L bytes, of the first MAC CE includes at least one set of consecutive N bits, where N is an integer greater than or equal to 2. Each group of N bits is used to indicate related information of BWPs for corresponding secondary cell.

In the following example, the first byte of the MAC CE represents an indication bit indicating that the carrier enters the dormant state. For example, C3=1 indicates that a Scell corresponding to the Scellindex enters the dormant state. Assuming that three scarriers enter the dormant state, then Cx, Cy, and Cz have one-to-one correspondence with Scellindexs for Sscell in the Dormant state in ascending order.

The target BWP for the first secondary cell in the first state is determined by the following operations.

When the number of configured BWPs is not greater than M and the related information is an identification of the BWP, the target BWP for the first secondary cell in the first state is determined based on the identification of the BWP. M is an integer less than or equal to preset number.

When the number of configured BWPs is greater than M and the related information is the identification of the BWP, the target BWP for the first secondary cell in the first state is determined by subtracting a first value from the identification of the BWP.

When the related information is an order value of a BWP, the target BWP is determined based on the order value of the BWP.

Referring to FIG. 10, if the number of configured BWPs is less than or equal to 3, the two Cxbits correspond to the id of a BWP on which UE performs CQI measurement on the carrier with the smallest index in the SCell in the dormant state. If the number of configured BWPs is 4, the two Cxbits correspond to the id of the BWP on which UE performs CQI measurement on the carrier with the smallest index in the SCell in the dormant state minus 1 (i.e., BWP id-1), or correspond to the order index of the configured BWP, which similarly can refer to Table 1, and details will not elaborated herein.

It should be noted that in the first MAC CE, if the 8 bits are not fully occupied, then R is filled in as a reservation bit, or 0 is filled in to complete the 8 bits.

In the case of carrier aggregation of 32 carriers, the format of the first MAC CE may be as shown in FIG. 11, where four bytes are used to indicate whether the carrier of each cell enters the first state, and the other byte is used to indicate the target BWP for the secondary cell entering the first state.

Scenario 3: A first secondary cell is controlled to enter a first state based on a timer. The details are described as follows.

The method further includes configuring a timer for the terminal device.

As shown in FIG. 12, the terminal device is in the RRC connected state and receives an RRC reconfiguration message from the MN or SN to determine that the secondary cell enters the activated state. It may be understood for the embodiment that the first secondary cell is controlled to enter the activated state. For the active carrier (i.e., first secondary cell), a timer for controlling the terminal device to automatically enter the first state (i.e., dormant state) is started. If the timer expires, the first secondary cell for the terminal device enters the first state. The first state is maintained in the first secondary cell, and measurement is performed on the target BWP. In particular, the measurement may be CQI or RRM measurement.

In connection with the above multiple scenarios, in the embodiment, performing the measurement on the target BWP includes performing CQI and/or RRM measurement on the target BWP. Specific measurement modes are not limited in the embodiment.

It should also be noted that the present embodiment may further provide a manner in which the above processing may be used for CQI measurement, but the RRM measurement, it may be performed according to the configuration of RRC signaling. For example, it is directly indicated in the RRC signaling that the RRM measurement is performed on a certain BWP without using the above processing for determination of BWP.

By using the above solution, the terminal device can be controlled to enter a first state in which the terminal device only performs measurement and does not perform data processing, and the terminal device is enabled to perform measurement on the target BWP. In this way, the terminal device can provide a reliable measurement result to the network side while saving power, thereby ensuring the accuracy of scheduling the terminal device, improving the system capacity and the throughput of the terminal device.

Embodiment 3

The present embodiment provides a terminal device that is served by a primary cell and at least one secondary cell. As shown in FIG. 16, the terminal device includes a first processing unit 41.

The first processing unit 41 is configured to determine a first secondary cell that is in a first state, where the first state is a state in which the terminal device is capable of performing measurement and does not perform data reception and transmission, and the first secondary cell is one of the at least one secondary cell; determine a target BWP for the first secondary cell in the first state; and perform measurement on the target BWP.

The present embodiment provides the following specific processing scenarios.

Scenario 1:

The measurement is performed on a specified BWP in a protocol-specified manner.

Specifically, the terminal device further includes a first communication unit 42.

The first communication unit 42 is configured to receive configuration information. The first processing unit 41 is configured to determine a first secondary cell being able to enter the first state based on the configuration information.

The first communication unit 42 is further configured to receive RRC signaling from a network device and obtain the configuration information carried in the RRC signaling.

For example, referring to FIG. 6, when the terminal device is in an RRC connected state, the terminal device receives RRC signaling or an MAC CE from the network device (such as a MN or a SN), configures the first secondary cell to enter the first state through the RRC signaling. Further, the terminal device controls the secondary cell (i.e., first secondary cell) to remain in the first state, and performs CQI measurement on a BWP, which is the above target BWP.

The RRC signaling further includes at least two BWPs configured by the network device for the terminal device.

Further, the first processing unit 41 is configured to perform one of the following operations.

The target BWP for the first secondary cell in the first state is determined based on a target BWP carried in the RRC signaling and indicated by the network device. That is, the secondary cell (Scell) is configured to enter the dormant state through the RRC signaling, and at most four BWPs are configured and identification (id) of the first active BWP is indicated by the RRC signaling, and the first active BWP is the BWP on which the UE performs the CQI measurement on the dormant carrier.

A BWP on which the RRC signaling is received is used as the target BWP of the first secondary cell in the first state. That is, Scell is configured to enter the dormant state through the RRC signaling and at the same time, at most four BWPs are configured by the RRC signaling. Then, the BWP on which the RRC message is received is the BWP where the UE performs CQI measurement on the dormant carrier. The BWP on which the message is received is the BWP on which CQI measurement is performed.

Alternatively, other explicit signaling may be used to indicate that a BWP is the BWP on which the UE performs CQI measurements on the dormant carrier.

Scenario 2 differs from scenario 1 in that the first secondary cell is instructed to enter the first state by the MAC CE in this scenario.

Specifically, similar to Scenario 1, that is, the configuration information is obtained by RRC signaling from a network device. The configuration information may include information of at least one cell configured for a terminal device by the network device, such as MN or SN, and information of BWP of each cell (especially the secondary cell). The BWP information of each cell or the secondary cell may be at least two BWPs configured for the cell.

The first communication unit 42 is configured to receive a control instruction from a network device. The control instruction is used for instructing each secondary cell of the terminal device to enter the first state. The control instruction is transmitted through a first MAC CE.

That is, after the secondary cell enters the activated state, the configuration information carried in the RRC signaling is received by the terminal device, then a control instruction from the MAC CE is received, and it is determined that the first secondary cell enters the first state according to the indication of the control instruction.

As shown in FIG. 7, the terminal device receives RRC signaling from the MN or the SN, where the RRC signaling includes the configuration of secondary cells and the configuration of the BWP of each secondary cell, and thus the terminal device acquires the configuration information of the SCell from the configuration in the RRC signaling. The terminal device receives a MAC CE indication that instructs the terminal device to enter the first state, i.e., the dormant state. Thereafter, the terminal device enters and remains in the first state and performs measurement on the target BWP, where the measurement specifically may be CQI measurement and/or RRM measurement.

The first processing unit 41 is configured to perform one of the following operations.

A BWP on which the first MAC CE is received is used as the target BWP of the first secondary cell in the first state. That is, the terminal device determines the BWP on which the MAC CE is received as the BWP on which the CQI measurement is performed on the dormant carrier.

A default BWP configured by the network device is used as the target BWP of the first secondary cell in the first state. That is, the default BWP configured on the network side is the BWP on which the UE performs CQI measurement on the dormant carrier.

An initial BWP configured by the network device is used as the target BWP of the first secondary cell in the first state. That is, the initial BWP configured on the network side is the BWP on which the UE performs CQI measurement on the dormant carrier.

A second MAC CE from the network device is received by the terminal device, and the target BWP of the first secondary cell in the first state is determined based on the second MAC CE. The second MAC CE is different from the first MAC CE. That is, a new MAC CE is received and the MAC CE indicates a BWP is the BWP on which the UE performs CQI measurement on the dormant carrier.

The target BWP is determined according to an indication of RRC signaling. That is, the BWP on which the UE performs CQI measurement on the dormant carrier is indicated by the RRC signaling. The RRC signaling may be newly transmitted RRC signaling, or may be RRC signaling for transmitting configuration information. When the RRC signaling is RRC signaling for transmitting the configuration information, it may be understood that the RRC signaling may further indicate the target BWP in addition to the configuration information included therein.

An indicated target BWP for the first secondary cell in the first state is obtained from the first MAC CE. That is, the BWP indicated in the MAC CE that instructs the UE to enter the first state (i.e., dormant state) is the BWP on which the CQI measurement is performed on the dormant carrier.

At least two BWPs configured by the network device and a first active BWP indicated by the network device are obtained by the RRC signaling, and the first active BWP is used as the target BWP of the first secondary cell in the first state. For example, at most four BWPs is configured and identification information (ID) of the first active BWP is indicated by the RRCE signaling, and the first active BWP is the target BWP on which the terminal device performs CQI measurement on the dormant carrier.

Further, the target BWP for the first secondary cell in the first state is determined based on the second MAC CE by the following operations. Related information of BWPs indicated by the second MAC CE is determined based on information included in N bits of the second MAC CE, and the target BWP is determined based on the related information of the BWPs. N is an integer greater than or equal to 2.

The value of N may be set according to the actual situation. For example, when the number of BWPs does not exceed 4, N may be 2.

The target BWP is determined based on the related information of the BWPs includes the following operations.

When the number of configured BWPs is not greater than M and the related information is identification of the BWP, the target BWP is determined based on the identification of the BWP. M is an integer less than or equal to a preset number.

When the number of configured BWPs is greater than M and the related information is the identification of the BWP, the target BWP is determined by subtracting a first value from the identification of the BWP.

When the related information is an order value of a BWP, the target BWP is determined based on the order value of the BWP.

The value of M may be set according to the actual situation, and may be four or other configurations, which will not be exhaustive in the embodiment.

The N bits of the second MAC CE are N bits of the same position in the N bytes respectively. Or the N bits in the second MAC CE are consecutive N bits.

Other specific processing in the scenario is the same as those in embodiment 1, and will not be repeated herein.

Scenario 3: A first secondary cell is controlled to enter a first state based on a timer. The details are as follows.

A first processing unit 41 is configured to start a timer when the first secondary cell is in the activated state, and determine that the first secondary cell enters a first state if the timer expires.

As shown in FIG. 12, the terminal device is in the RRC connected state and receives an RRC reconfiguration message from the MN or SN to determine that the secondary cell enters the activated state. It may be understood in the embodiment that the first secondary cell is controlled to enter the activated state. For the active carrier (i.e., the first secondary cell), a timer for controlling the terminal device to automatically enter the first state (i.e., the dormant state) is started. If the timer expires, the first secondary cell for the terminal device enters the first state. The first state is maintained in the first secondary cell, and measurement is performed on the target BWP. In particular, the measurement may be CQI or RRM measurement.

The first processing unit 41 is configured to perform one of the following operations.

A BWP on which the terminal device is located is used as the target BWP of the first secondary cell in the first state when the timer expires. For example, the BWP located when the timer expires is used as the BWP on which the CQI measurement is performed on the dormant carrier.

A default BWP configured based on a network device is used as the target BWP of the first secondary cell in the first state.

An initial BWP configured by the network device is used as the target BWP of the first secondary cell in the first state.

A second MAC CE from a network device is received by the terminal device, and the target BWP for the first secondary cell in a first state is determined based on the second MAC CE. The second MAC CE is different from a first MAC CE;

The target BWP of the first secondary cell in the first state is determined based on an indication of RRC signaling.

A first active BWP indicated by RRC signaling is used as the target BWP of the first secondary cell in the first state. For example, at most four BWPs are configured and the identification (id) of the first active BWP is indicated by the RRC signaling. The first active BWP is the target BWP on which the CQI measurement is performed on the first secondary cell in the dormant state.

The target BWP for the first secondary cell in the first state is determined based on the second MAC CE by the following operations.

The related information of BWP indicated by the second MAC CE is determined based on information included in N bits of the second MAC CE. The target BWP is determined based on the related information of BWP. N is an integer greater than or equal to 2.

The target BWP for the first secondary cell in the first state is determined based on the related information of the BWP by the following operations.

When the number of configured BWPs is not greater than M and the related information is identification of the BWP, the target BWP is determined based on the identification of the BWP. M is an integer less than or equal to a preset number.

When the number of configured BWPs is greater than M and the related information is the identification of the BWP, the target BWP is determined by subtracting a first value from the identification of the BWP.

When the related information is an order value of a BWP, the target BWP is determined based on the order value of the BWP.

The N bits in the second MAC CE are N bits in same position of the N bytes. Or, the N bits in the second MAC CE are consecutive N bits.

The description of the format of the second MAC CE is the same as that in Scenario 2, and details are not described herein.

In connection with the above multiple scenarios, the operation that the measurement is performed on the target BWP described in this embodiment includes: performing CQI measurement and/or RRM measurement on the target BWP. Specific measurement modes are not limited in this embodiment.

It should also be noted that the embodiment may further provide a manner in which the above processing may be used for CQI measurement, but for the RRM measurement, it may be performed according to the configuration of RRC signaling. For example, it is directly indicated in the RRC signaling that the RRM measurement is performed on a certain BWP without using the above processing for BWP determination.

By using the above solution, the terminal device can be controlled to enter a first state in which the terminal device only performs measurement and does not perform data processing, and the terminal device is enabled to perform measurement on the target BWP. In this way, the terminal device can provide a reliable measurement result for the network side while saving power, thereby ensuring the accuracy of scheduling the terminal device, and improving the system capacity and the throughput of the terminal device.

Embodiment 4

The present embodiment provides a network device, including the second communication unit 51 as shown in FIG. 17.

The second communication unit 51 is configured to transmit configuration information to a terminal device. The configuration information is used to indicate a first secondary cell being able to enter the first state, and the first state is a state in which the terminal device is capable of performing measurement and does not perform data reception and transmission, and the terminal device is served by a primary cell and at least one secondary cell, and the first secondary cell is one of the at least one secondary cell.

The embodiment may be applied in a scenario where the Carrier Aggregation (CA) technology is supported in the 5G. As shown in FIG. 3, the CA enables the NR system to support a larger bandwidth by jointly scheduling and using resources on a plurality of Component Carriers (CC), thereby enabling to implement a higher system peak rate. According to the continuity of the aggregated carriers in the frequency spectrum, CA may be divided into continuous carrier aggregation and non-continuous carrier aggregation. CA may be divided into Intra-band carrier aggregation and inter-band carrier aggregation according to whether the bands in which the aggregated carriers are located are the same.

The first state introduced in the embodiment may be understood as the dormant state. Further, the state of cell may be divided into activated state and deactivated state, and in order to accelerate the restoration of the cell, a new cell state, also called a first state (i.e., dormant state) is defined. In the first state, the terminal device is capable of performing measurement and reporting of CQI and performing RRM measurement, but does not decode a PDCCH.

BWP as mentioned in the above solutions is described as follows. The maximum channel bandwidth may be 400 MHZ (wideband carrier) in 5G, which is larger compared to the maximum bandwidth of 20 MHZ in LTE. If the terminal device remains operating on a wideband carrier, the power consumption of the UE is large. It is therefore suggested that the RF bandwidth of the terminal device may be adjusted according to the actual throughput of the UE. In view of this, the motive for introducing the BWP is to optimize the power consumption of the terminal device. For example, if the speed of the terminal device is low, and a smaller bandwidth may be configured for the terminal device (FIG. 5A), and if the speed of the terminal device is high, a larger bandwidth may be configured for the terminal device (FIG. 5B). If the terminal device supports a high rate, or operates in a Carrier Aggregation (CA) mode, a plurality of BWPs may be configured (FIG. 5C) for the terminal device. Another purpose of BWP is to trigger the coexistence of multiple numerologies in a cell.

Based on the above description, an embodiment provides the following specific processing scenarios.

Scenario 1:

The measurement is performed on a specified BWP in a protocol-specified manner.

Specifically, the second communication unit 51 is configured to transmit RRC signaling to the terminal device. The RRC signaling carries configuration information.

For example, referring to FIG. 6, when the terminal device is in an RRC connected state, the terminal device receives RRC signaling or an MAC CE from the network device (such as a MN or a SN), configures the first secondary cell to enter the first state through the RRC signaling. Then, the terminal device controls the secondary cell (i.e., the first secondary cell) to remain in the first state, and performs CQI measurement on one BWP, that is, the target BWP as described above.

The RRC signaling further includes at least two BWPs configured by the network device for the terminal device.

Further, the RRC signaling further carries a target BWP indicated by the network device.

Scenario 2 differs from scenario 1 in that the first secondary cell is instructed to enter the first state by the MAC CE in this scenario. Specifically, similar to Scenario 1, that is, the configuration information is obtained by RRC signaling from a network device. The configuration information may include information of at least one cell configured for a terminal device by the network device, such as MN or SN, and information of BWP of each cell (especially the secondary cell). The BWP information of each cell or secondary cell may be at least two BWPs configured for the cell.

The second communication unit 51 is configured to transmit a control instruction to the terminal device. The control instruction is used for instructing each secondary cell of the terminal device to enter the first state. The control instruction is transmitted through a first MAC CE.

That is, after the secondary cell enters the activated state, the configuration information carried in the RRC signaling is received by the terminal device, then a control instruction from the MAC CE is received, and it is determined that the first secondary cell enters the first state according to the indication of the control instruction.

As shown in FIG. 7, the terminal device receives RRC signaling from the MN or the SN, Where the RRC signaling includes the configuration of secondary cells and the configuration of the BWP of each secondary cell, and thus the terminal device acquires the configuration information of the SCell from the configuration in the RRC signaling. The terminal device receives a MAC CE indication that instructs the terminal device to enter the first state, i.e., the dormant state is received. Thereafter, the terminal device enters and remains in the first state and performs measurement on the target BWP. The measurement specifically may be CQI measurement and/or RRM measurement.

The second communication unit 51 further configured to perform one of the following operations.

A default BWP is configured for the terminal device.

An initial BWP is configured for the terminal device.

A second MAC CE is transmitted to the terminal device. The second MAC CE is used to enable the terminal device to determine a target BWP. The second MAC CE is different from the first MAC CE.

The target BWP is indicated by RRC signaling.

The target BWP is indicated by the first MAC CE.

At least two BWPs are configured and a first active BWP is indicated for the terminal device via RRC signaling. Further, N bits of the second MAC CE comprise related information of the indicated BWP, where N is an integer greater than or equal to 2.

The value of N may be set according to the actual situation. For example, when the number of BWPs does not exceed 4, N may be 2.

The N bits of the second MAC CE are N bits of the same position in the N bytes respectively. Or the N bits in the second MAC CE are consecutive N bits Scenario 3: A first secondary cell is controlled to enter a first state based on a timer. The details are described as follows.

The second communication unit 51 is configured to configure a timer for the terminal device.

As shown in FIG. 12, the terminal device is in the RRC connected state and receives an RRC reconfiguration message from the MN or SN to determine that the secondary cell enters the activated state. It may be understood that in the embodiment, the first secondary cell is controlled to enter the activated state. For the active carrier (i.e., the first secondary cell), a timer for controlling the terminal device to automatically enter the first state (i.e., the dormant state) is started. If the timer expires, the first secondary cell for the terminal device enters the first state. The first state is maintained in the first secondary cell, and measurement is performed on the target BWP. Specifically, the measurement may be CQI measurement or RRM measurement.

In connection with the above multiple scenarios, in the embodiment, performing the measurement on the target BWP includes performing CQI and/or RRM measurement on the target BWP. Specific measurement modes are not limited in the embodiment.

It should also be noted that the present embodiment may further provide a manner in which the above processing may be used for CQI measurement, but for the RRM measurement, it may be performed according to the configuration of RRC signaling. For example, it is directly indicated in the RRC signaling that the RRM measurement is performed on a certain BWP without using the above processing for BWP determination.

The specific processing of the units provided in the present embodiment is the same as those provided in the above method, and therefore details are not described.

By using the above solution, the terminal device can be controlled to enter a first state in which the terminal device only performs measurement and does not perform data processing, and the terminal device is enabled to perform measurement on the target BWP. In this way, the terminal device can provide a reliable measurement result for the network side while saving power, thereby ensuring the accuracy of scheduling the terminal device, improving the system capacity and the throughput of the terminal device.

Figure 18:
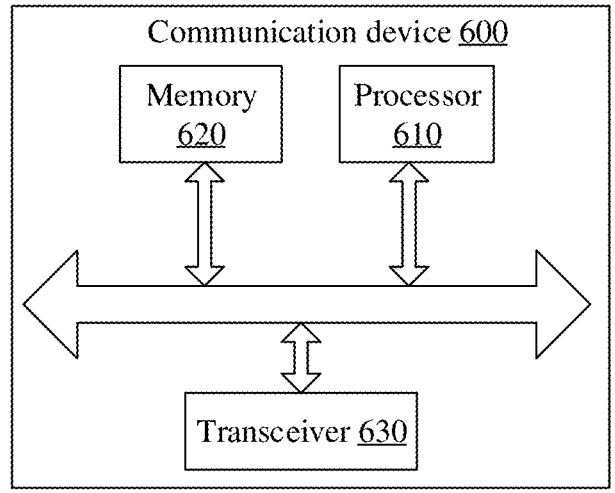
FIG. 18 is a schematic structural diagram of a communication device according to embodiments of the present disclosure.

FIG. 18 is a schematic structural diagram of a communication device 600 according to embodiments of the present disclosure. The communication device may be a terminal device or a network device as described in the foregoing embodiments of the present disclosure. The communication device 600 shown in FIG. 18 includes a processor 610. The processor 610 is configured to call and execute the computer program stored in a memory to implement the methods in the embodiments of the present disclosure.

Alternatively, as shown in FIG. 18, the communication device 600 may also include a memory 620. The processor 610 may call and execute the computer program stored in the memory 620 to implement the method in the embodiments of the present disclosure.

The memory 620 may be a separate device independent of the processor 610, or may be integrated in the processor 610.

Alternatively, as shown in FIG. 18, the communication device 600 may also include a transceiver 630. The processor 610 may control the transceiver 630 to communicate with other devices, and specifically, may transmit information or data to other devices or receive information or data transmitted by other devices.

The transceiver 630 may include a transmitter and a receiver. The transceiver 630 may further include an antenna, and the number of antennas may be one or more.

Alternatively, the communication device 600 may be specifically a network device according to embodiments of the present disclosure, and the communication device 600 may implement a corresponding flow implemented by the network device in each method according to the embodiments of the present disclosure, which is not elaborated herein for simplicity.

Alternatively, the communication device 600 may be specifically a terminal device or a network device according to the embodiments of the present disclosure, and the communication device 600 may implement a corresponding flow implemented by a mobile terminal/terminal device in each method according to the embodiments of the present disclosure. For brevity, details are not described herein.

Figure 19:
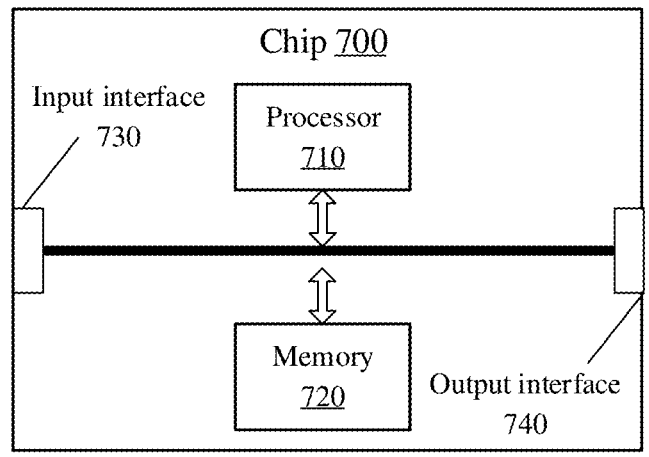
FIG. 19 is a schematic block diagram of a chip according to embodiments of the present disclosure.

FIG. 19 is a schematic block diagram of a chip according to embodiments of the present disclosure. The chip 700 shown in FIG. 19 includes a processor 710. The processor 710 is capable of calling and executing a computer program in a memory to implement the methods in the embodiments of the present disclosure.

Alternatively, as shown in FIG. 19, the chip 700 may also include a memory 720. The processor 710 may call and execute a computer program from the memory 720 to implement the method in the embodiments of the present disclosure.

The memory 720 may be a separate device independent of the processor 710, or may be integrated in the processor 710.

Alternatively, the chip 700 may also include an input interface 730. The processor 710 may control the input interface 730 to communicate with other devices or chips, and specifically, may acquire information or data transmitted by other devices or chips.

Alternatively, the chip 700 may also include an output interface 740. The processor 710 may control the output interface 740 to communicate with other devices or chips, and specifically may output information or data to other devices or chips.

Alternatively, the chip may be applied to the network device in the embodiments of the present disclosure, and the chip may implement a corresponding flow implemented by the network device in each method according to the embodiments of the present disclosure. For brevity, details are not described herein.

Alternatively, the chip may be applied to the terminal device in the embodiments of the present disclosure, and the chip may implement a corresponding flow implemented by the terminal device in each method according to the embodiments of the present disclosure. For brevity, details are not described herein.

It should be understood that the chip mentioned in the embodiments of the present disclosure may also be referred to as a system-level chip, system chip, chip system or system-on-chip.

Figure 20:
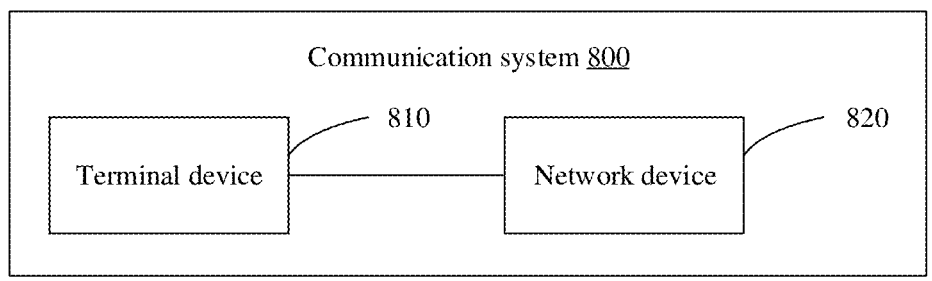
FIG. 20 is the second schematic diagram of communication system architecture according to embodiments of the present disclosure.

FIG. 20 is a schematic block diagram of a communication system 800 according to embodiments of the present disclosure. As shown in FIG. 20, the communication system 800 includes a terminal device 810 and a network device 820.

Herein, the terminal device 810 may be configured to implement the corresponding functions implemented by the terminal device in the above method, and the network device 820 may be configured to implement the corresponding functions implemented by the network device in the above method. For brevity, details are not described herein.

It should be understood that the processor of embodiments of the present disclosure may be an integrated circuit chip having signal processing capabilities. In implementation, the steps of the above method embodiments may be accomplished by integrated logic circuits of hardware in the processor or instructions in the form of software. The above processor may be a general purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, to implement the methods, steps, and logical block diagrams disclosed in the embodiments of the present disclosure. The general purpose processor may be a microprocessor or the processor may be any conventional processor or the like. The steps of the method disclosed in connection with the embodiments of the present disclosure may be directly performed by a hardware decoding processor, or performed by a combination of hardware and software modules in the decoding processor. The software modules may be located in a storage medium mature in the art such as a random access memory, a flash memory, a read-only memory, a programmable read-only memory, or an electrically erasable programmable memory, a register, or the like. The storage medium is located in a memory, and the processor reads information in the memory and performs the steps of the above method in conjunction with its hardware.

It should be understood that the memory in embodiments of the present disclosure may be volatile memory or nonvolatile memory, or may include both volatile and nonvolatile memory. The nonvolatile memory may be Read-Only Memory (ROM), Programmable ROM (PROM), Erasable PROM (EPROM), Electrically EPROM (EEPROM), or flash memory. The volatile memory may be a Random Access Memory (RAM), which functions as an external cache. By way of example, and not limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that the memories of the systems and methods described herein are intended to include, but are not limited to, these and any other suitable types of memories.

It should be understood that the above memory is exemplary, but not limiting, and that the memory in the embodiments of the present disclosure may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM), Direct Rambus RAM (DR RAM), or the like. That is, the memory in the embodiments of the present disclosure is intended to include, but is not limited to, these and any other suitable types of memory.

An embodiment of the present disclosure further provides a computer readable storage medium for storing a computer program.

Alternatively, the computer-readable storage medium may be applied to the network device in the embodiments of the present disclosure, and the computer program causes the computer to execute the corresponding flow implemented by the network device in each method according to methods in the embodiments of the present disclosure. For brevity, details are not described herein.

Alternatively, the computer-readable storage medium may be applied to the terminal device in the embodiments of the present disclosure, and the computer program causes the computer to execute the corresponding flow implemented by the mobile terminal/terminal device in each method according to the embodiments of the present disclosure. For brevity, details are not described herein.

An embodiment of the present disclosure further provides a computer program product including computer program instructions.

Alternatively, the computer program product may be applied to the network device in the embodiments of the present disclosure, and the computer program instructions cause the computer to execute the corresponding flow implemented by the network device in each method according to the embodiments of the present disclosure. For brevity, details are not described herein.

Alternatively, the computer program product may be applied to the mobile terminal/terminal device in the embodiments of the present disclosure, and the computer program instructions cause the computer to execute the corresponding flows implemented by the mobile terminal/terminal device in each method in the embodiments of the present disclosure. For brevity, details are not described herein.

An embodiment of the application also provides a computer program.

Alternatively, the computer program may be applied to the network device in the embodiment of the present disclosure. The computer program, when running on a computer, causes the computer to execute the corresponding flow implemented by the network device in each method according to the embodiments of the present disclosure. For brevity, details are not described herein.

Alternatively, the computer program may be applied to the mobile terminal/terminal device in the embodiments of the present disclosure, and the computer program, when running on a computer, causes the computer to execute the corresponding flow implemented by the mobile terminal/terminal device in each method according to the embodiments of the present disclosure. For brevity, details are not described herein.

Those of ordinary skill in the art will recognize that the elements and algorithm steps of the examples described in connection with the embodiments disclosed herein be implemented in electronic hardware, or a combination of computer software and electronic hardware. Whether these functions are performed in hardware or software depends on the particular application and design constraints of the solution. The skilled artisan may use different methods to implement the described functions for each particular application, but such implementation should not be considered to be outside the scope of the present disclosure.

It should be known to those skilled in the art that for the convenience and brevity of the description, reference may be made to the corresponding processes in the above method embodiments for the specific working procedures of the above systems, apparatuses and units, and details will not be described herein.

In the several embodiments provided in the present disclosure, it should be understood that the disclosed systems, apparatus, and methods may be implemented in other ways. For example, the device embodiments described above are merely illustrative, for example, the division of the cells is merely a logical functional division, and there may be additional division in practice, for example, a plurality of cells or components may be combined or integrated into another system, or some features may be ignored or not performed. On the other hand, the coupling or direct coupling or communication connection between each other shown or discussed may be through some interface, indirect coupling or communication connection of a device or unit, and may be in electrical, mechanical or other form.

The elements illustrated as separate elements may or may not be physically separate, and the elements shown as elements may or may not be physical elements, may be located at one location, or may be distributed across multiple network elements. Some or all of the elements may be selected according to actual needs to achieve the objectives of the embodiments.

In addition, the functional units in the various embodiments of the present disclosure may be integrated in one processing unit, may be separate physical units, or may be integrated in two or more units.

The functions, if implemented as software functional units and sold or used as separate products, may be stored in a computer-readable storage medium. Based on such an understanding, the technical solution of the present disclosure may be embodied in the form of a software product, which is stored in a storage medium and includes instructions for causing a computer device (which may be a personal computer, a server, a network device, or the like) to perform all or some of the steps of the methods described in the various embodiments of the present disclosure. The storage medium includes a USB flash drive, a removable hard disk, a Read-Only Memory (ROM), a Random Access Memory (RAM), a magnetic disk, or an optical disk.

The above description is merely illustrative of the specific embodiments of the present disclosure, but the scope of protection of the present disclosure is not limited thereto. Variations or substitutions may readily occur to those skilled in the art within the technical scope disclosed in the present disclosure, and are intended to be included within the scope of protection of the present disclosure. Accordingly, the scope of protection of the present disclosure shall be as described with reference to the scope of protection of the claims.

The invention claimed is:

1. A method for measurement control, applied to a terminal device served by a primary cell and a plurality of secondary cells, the method comprising:
   receiving configuration information;
   determining a first secondary cell that is in a first state according to the configuration information, wherein the first state is a state where the terminal device is capable of performing measurement and does not perform data reception and transmission, and the first secondary cell is one of the plurality of secondary cells;
   determining a target bandwidth part (BWP) for the first secondary cell in the first state; and
   performing measurement on the target BWP, wherein performing measurement on the target BWP comprises at least one of: performing Channel Quality Indication (CQI) measurement on the target BWP for reporting CQI to the network device, or, performing Radio Resource Management (RRM) measurement on the target BWP for reporting RRM to the network device;
   wherein receiving the configuration information comprises:
      receiving radio resource control (RRC) signaling from the network device, and obtaining the configuration information carried in the RRC signaling;
      wherein the RRC signaling further comprises at least two BWPs corresponding to the plurality of secondary cells configured by the network device for the terminal device;
   wherein determining the target BWP for the first secondary cell that is in the first state comprises:

using a BWP on which the RRC signaling is received as the target BWP of the first secondary cell in the first state.

2. The method of claim 1, wherein after receiving the RRC signaling from the network device, the method further comprises:

receiving a control instruction from the network device, wherein the control instruction is used for instructing each secondary cell of the terminal device to enter the first state.

3. The method of claim 1, wherein before determining the secondary cell that is in the first state, the method further comprises:

starting a timer when the first secondary cell is in an activated state; and determining that the first secondary cell enters the first state when the timer expires.

4. A terminal device, wherein the terminal device is served by a primary cell and a plurality of secondary cells, and comprises:

a processor, configured to:
  receive configuration information;
  determine a first secondary cell that is in a first state according to the configuration information, wherein the first state is a state in which the terminal device is capable of performing measurement and does not perform data reception and transmission, and the first secondary cell is one of the plurality of secondary cells;
  determine a target bandwidth part (BWP) for the first secondary cell in the first state; and
  perform measurement on the target BWP, wherein the measurement on the target BWP comprises at least one of: Channel Quality Indication (CQI) measurement on the target BWP for reporting CQI to the network device, or, Radio Resource Management (RRM) measurement on the target BWP for reporting RRM to the network device;

wherein the processor is further configured to:
  receive radio resource control (RRC) signaling from the network device, and obtain the configuration information carried in the RRC signaling;
  wherein the RRC signaling further comprises at least two BWPs corresponding to the plurality of secondary cells configured by the network device for the terminal device;

wherein the processor is further configured to:
  use a BWP on which the RRC signaling is received as the target BWP of the first secondary cell in the first state.

5. The terminal device of claim 4, wherein the transceiver is configured to receive a control instruction from the network device, wherein the control instruction is used for instructing each secondary cell of the terminal device to enter the first state.

6. The terminal device of claim 4, wherein the processor is configured to: start a timer when the first secondary cell is in an activated state and determine that the first secondary cell enters the first state when the timer expires.

* * * * *